United States Patent
Slutsky et al.

(10) Patent No.: US 10,395,539 B2
(45) Date of Patent: Aug. 27, 2019

(54) NON-LINE OF SIGHT OBSTACLE DETECTION AND LOCALIZATION

(71) Applicant: GM Global Technology Operations LLC, Detroit, MI (US)

(72) Inventors: Michael Slutsky, Kfar Saba (IL); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 624 days.

(21) Appl. No.: 15/161,872

(22) Filed: May 23, 2016

(65) Prior Publication Data

US 2017/0287334 A1 Oct. 5, 2017

Related U.S. Application Data

(60) Provisional application No. 62/316,103, filed on Mar. 31, 2016.

(51) Int. Cl.
| | |
|---|---|
| *G08G 1/16* | (2006.01) |
| *G01S 13/62* | (2006.01) |
| *G01S 13/86* | (2006.01) |
| *G01S 13/42* | (2006.01) |
| *G01S 13/536* | (2006.01) |

(Continued)

(52) U.S. Cl.
CPC ............ *G08G 1/166* (2013.01); *G01S 13/42* (2013.01); *G01S 13/536* (2013.01); *G01S 13/538* (2013.01); *G01S 13/62* (2013.01); *G01S 13/867* (2013.01); *G01S 13/881* (2013.01); *G01S 13/931* (2013.01); *G08G 1/165* (2013.01); *G05D 1/0257* (2013.01)

(58) Field of Classification Search
USPC .......................................................... 342/52
See application file for complete search history.

(56) References Cited

U.S. PATENT DOCUMENTS

| | | | |
|---|---|---|---|
| 2005/0073438 A1* | 4/2005 | Rodgers ................. | G08G 1/161 340/944 |
| 2011/0087433 A1* | 4/2011 | Yester ..................... | G08G 1/163 701/301 |

(Continued)

OTHER PUBLICATIONS

Poullin et al., Around-the-corner radar: detection of a human being in non-line of sight, Feb. 2015, Published in IET Radar, Sonar and Navigation (Year: 2015).*

(Continued)

*Primary Examiner* — Marcus E Windrich
(74) *Attorney, Agent, or Firm* — Cantor Colburn LLP

(57) ABSTRACT

A non-line of sight obstacle detection and localization system and method of detecting and localizing a non-line of sight object include receiving reflections at a detection system of a moveable platform, the reflections including direct and multipath reflections, identifying the reflections associated with static targets to retain the reflections associated with moving targets, and distinguishing between line of sight objects and non-line of sight objects among the moving targets. The method also includes localizing the non-line of sight objects relative to the platform and indicating approaching non-line of sight objects among the non-line of sight objects, the approaching non-line of sight objects moving toward the platform on a path that intersects the platform.

15 Claims, 3 Drawing Sheets

(51) Int. Cl.
G01S 13/538 (2006.01)
G01S 13/93 (2006.01)
G01S 13/88 (2006.01)
G05D 1/02 (2006.01)

(56) References Cited

U.S. PATENT DOCUMENTS

| | | | |
|---|---|---|---|
| 2012/0068859 A1* | 3/2012 | Mochizuki | G08G 1/161 340/903 |
| 2013/0113618 A1* | 5/2013 | Flanagan | G08G 1/166 340/539.1 |
| 2014/0155090 A1* | 6/2014 | Khorashadi | H04W 4/04 455/456.2 |
| 2014/0309870 A1* | 10/2014 | Ricci | H04W 4/21 701/36 |
| 2016/0349365 A1* | 12/2016 | Ling | G01S 13/931 |
| 2018/0083363 A1* | 3/2018 | Izadian | H01Q 15/148 |

OTHER PUBLICATIONS

Prokhorov et al. Radar-vision fusion for object classification, Sep. 2008, Published in: 2008 11th International Conference on Information Fusion (Year: 2008).*

Xiao, et. al Non-line of sight Identification and Mitigation using Received Signal strength, published Mar. 2015 (Year: 2015).*

Al-Jazzar et al., "New algorithms for NLOS Identification", pp. 1-5, retrieved Mar. 9, 2016, retrieved from the Internet http://citeseerx.ist.psu.edu/viewdoc/download?doi=10.1.1.500.1356&rep=rep1&type=pdf.

N.A., "Chapter 14: Doppler Measurement", pp. 443-462, retrieved Mar. 9, 2016, retrieved from the Internet http://www.acfr.usyd.edu.au/pdfs/training/sensorSystems/14%20Doppler%20Measurement.pdf.

Parker, Michael "Radar Basics—Part 3: Beamforming and radar digital processing", pp. 1-9, retrieved Mar. 7, 2016, retrieved from the Internet http://www.eetimes.com/document.asp?doc_id=1278838.

Radartutoria.eu, "Radar Basics—The Radar Equation", pp. 1-3, retrieved Mar. 7, 2016, retrieved from the Internet http://www.radartutorial.eu/01.basics/The%20Radar%20Range%20Equation.en.html.

Schneider, Martin "Automotive Radar—Status and Trends", GeMiC, 2005, pp. 144-147.

Srirangarajan et al., "Localization in Wireless Sensor Networks Under Non Line-Of-Sight Propagation", Global Telecommunications Conference, 2005, pp. 1-5.

Tabaa et al., "LOS/NLOS Indentification Based on Stable distribution Feature Extraction and SVM Classifier for UWB On-Body Communications", The 2nd International Workshop on Body Area Sensor Networks, 2014, pp. 882-887.

Xiao et al., "Identification and Mitigation of Non-line-of-sight conditions Using Received Signal Strength", IEEE 9th International Conference on Wireless and Mobile Computing, Networking and Communications, 2013, pp. 1-8.

Xu, Wenjie, "Multi-Antenna Non-Line-of-Sight Identification Techniques for Target Localization in Mobile Ad-Hoc Networks", Dissertation, Michigan Technological University, 2011, pp. 1-181.

* cited by examiner

NON-LINE OF SIGHT OBSTACLE DETECTION AND LOCALIZATION

CROSS-REFERENCE TO RELATED APPLICATION

This application claims the benefit of priority to U.S. Provisional Patent Application Ser. No. 62/316,103 filed Mar. 31, 2016, the disclosure of which is incorporated by reference herein in its entirety.

FIELD OF THE INVENTION

The subject invention relates to obstacle detection and, more particularly, to non-line of sight obstacle detection and localization.

BACKGROUND

Obstacle detection in different forms is part of a number of systems. For example, in automated manufacturing facilities, machines that transport equipment and components to different areas of the facility must detect and avoid obstacles. As another example, automated vacuums must detect and avoid obstacles such as stairs. As yet another example, obstacle detection is one of the tasks that must be accomplished by increasingly automated vehicles. Currently, obstacle detection refers to the detection of obstacles in the line of sight. Accordingly, it is desirable to provide non-line of sight obstacle detection and localization.

SUMMARY OF THE INVENTION

According to an embodiment, a method of detecting and localizing a non-line of sight object includes receiving reflections at a detection system of a moveable platform, the reflections including direct and multipath reflections; identifying the reflections associated with static targets to retain the reflections associated with moving targets; distinguishing between line of sight objects and non-line of sight objects among the moving targets; localizing the non-line of sight objects relative to the platform; and indicating approaching non-line of sight objects among the non-line of sight objects, the approaching non-line of sight objects moving toward the platform on a path that intersects the platform.

According to another embodiment, a non-line of sight obstacle detection and localization system disposed on a movable platform includes a transmitter section configured to transmit radio frequency signals from a plurality of transmit elements; a receiver section configured to receive reflections at a plurality of receive antenna elements, the reflections including direct and multipath reflections; and a processing system configured to identify the reflections associated with static targets to retain the reflections associated with moving targets, distinguish between line of sight objects and non-line of sight objects among the moving targets, localize the non-line of sight objects relative to the platform, and indicate approaching non-line of sight objects among the non-line of sight objects, the approaching non-line of sight objects moving toward the platform on a path that intersects the platform.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
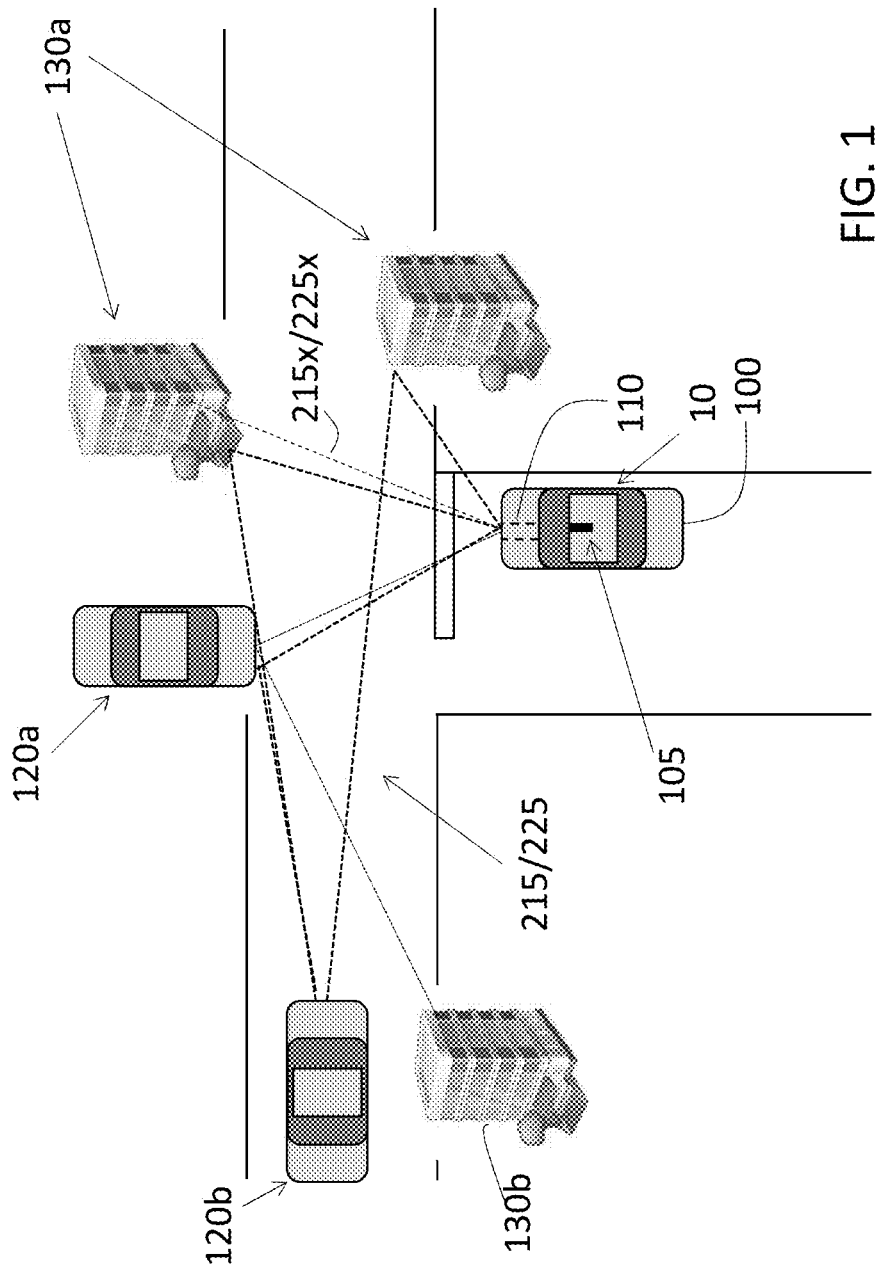
FIG. 1 is an illustration of non-line of sight obstacle detection according to embodiments.

The following description is merely exemplary in nature and is not intended to limit the present disclosure, its application or uses. It should be understood that throughout the drawings, corresponding reference numerals indicate like or corresponding parts and features.

As noted above, obstacle detection is part of the operation of many systems that include automated path-steering. Depending on the location and distances involved, different types of obstacle detection may be used. For example, automated vacuum cleaners that need to detect obstacles that are on the order of inches away may use infrared transmissions and reflections. In other applications, such as vehicle and aircraft applications, in which detection of obstacles at longer ranges is of interest, radio detection and ranging (radar) is generally used. Generally, radar systems transmit radio waves and determine range, angle (azimuth and elevation), and velocity of an object based on the reflection of the radio waves from the object. As such, typical radar detection relies on line-of-sight to the object (target) being detected. However, in vehicle collision-avoidance systems, for example, there is an interest in detecting objects that are not yet in the line of sight of the vehicle sensors. In accordance with exemplary embodiments of the invention, non-line of sight obstacle detection and localization is facilitated. As detailed below, radar data is combined with a predetermined or learned model of the current topology to deduce information about objects that are outside the line of sight. While the exemplary case of vehicle-based radar systems is described for explanatory purposes, the embodiments herein are not limited to being used within a vehicle system. Other vehicles (e.g., construction equipment, farm equipment) and other types of platforms are also contemplated. In addition, while a Doppler radar system is discussed as an exemplary embodiment of a non-line of sight detection system herein, any sensor system that provides range, azimuth, elevation, and velocity information may be used according to the detailed embodiments.

FIG. 1 is an illustration of non-line of sight obstacle detection according to embodiments. An exemplary intersection is illustrated, and the exemplary platform 10 for the non-line of sight obstacle detection system 110 is a vehicle. A host vehicle 100 that includes the detection system 110 (FIG. 2) according to embodiments detailed below is shown at the exemplary intersection. The host vehicle 100 may include other sensors 105 (e.g., camera, lidar system). Other vehicles 120a, 120b (that may also include the detection system 110) and other objects 130 (which are buildings in the exemplary illustration) are also shown in FIG. 1. The other objects 130a and one of the other vehicles 120a are within the line of sight of the detection system 110 of the host vehicle 100. One of the other objects 130b and the other vehicle 120b are not within the line of sight of the detection system 110 of the host vehicle 100. That is, transmissions 215 from the detection system 110 of the host vehicle 100 cannot directly reach the vehicle 120b or the object 130b based on the relative positions of the host vehicle 100 and the vehicle 120b or the object 130b shown in FIG. 1. As such, reflections 225 directly from the vehicle 120b or object 130b cannot be obtained with the detection system 110 of the host vehicle 100, as well.

However, as the dashed lines in FIG. 1 indicate, transmissions 215 from the detection system 110 of the host vehicle 100 may bounce off the other vehicle 120a and other objects 130a and reach the vehicle 120b or object 130b that are outside the line of sight of the detection system 110 of the host vehicle 100. Reflections 225 from the vehicle 120b or object 130b may also bounce off the other vehicle 120a and other objects 130 to reach the host vehicle 100. These bounced signals are referred to as multipath signals because, based on a transmission 215 by the detection system 110, reflections 225 may result from multiple paths. To be clear, only one of the direct transmissions 215x and resulting reflections 225x within the line of sight of the host vehicle 100 (to and from the vehicle 120a and the other objects 130) are shown to avoid obfuscating the multipath bounced signals (215/225) that are of interest according to the embodiments. For example, a transmission 215x may be reflected by the other object 130a and result in a reflection 225x directly back to the detection system 110 and, in addition, a transmission 215 may bounce off the other object 130a and result in a reflection 225 that actually originates at the non-line of sight vehicle 120b, as shown.

In a typical radar system, these bounced transmissions 215 and resulting bounced reflections 225 or multipath signals are an undesirable effect while the direct transmissions 215 to and reflections 225 from targets within the line of sight (vehicle 120, objects 130) are of interest. However, according to embodiments of the invention, these multipath reflections 225 are isolated and processed in order to perform non-line of sight obstacle detection and localization. The detection system 110 is detailed with reference to FIG. 2.

Figure 2:
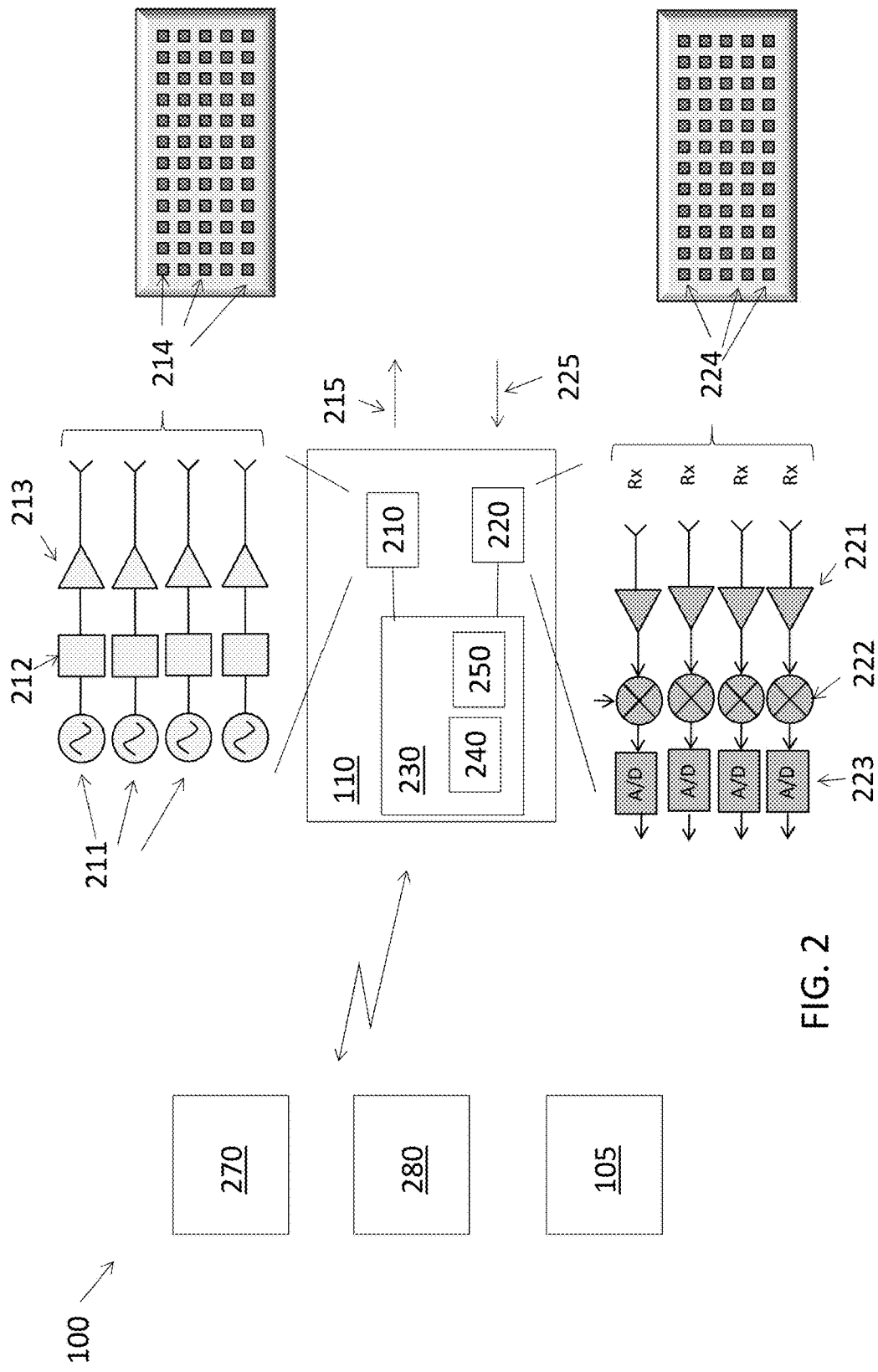
FIG. 2 is a block diagram of the detection system according to embodiments.

FIG. 2 is a block diagram of the detection system 110 according to embodiments. As noted above, the detection system 110, which is a Doppler radar system, is one exemplary embodiment, but any sensor system that provides similar information (e.g., velocity, range, azimuth, elevation) may be used in alternate embodiments. Automotive detection systems 110 used in vehicle platforms 10 like the host vehicle 100 may generally operate in continuous wave linear frequency modulation (CW-LFM) mode and may operate over frequency ranges from 21 to 27 gigahertz or 77 to 81 gigahertz. Energy is transmitted and received over a number of cycles to perform the non-line of sight detection and localization according to embodiments discussed herein. Information obtained from the detection system 110 may be supplied to car control systems 270, display systems 280. The detection system 110 may additionally communicate with other sensor systems 105 of the host vehicle 100. The car control systems 270 may include, for example, automatic braking or steering control systems. Display systems 280 may indicate a non-line of sight object (e.g., other vehicle 120b, FIG. 1) to the driver. Other sensor systems 105 of the host vehicle 100 may include mapping systems (e.g., global positioning system (GPS)), visual systems (e.g., mono or stereo camera systems), and ranging systems (e.g., LIDAR). These other sensor systems 105 may facilitate determination of the location of the host vehicle 100 and a model of the topology at the location.

The detection system 110 includes a transmitter section 210, a receiver section 220, and a processing system 230. The detection system 110 may be a multi input multi output (MIMO) array radar, as shown. Thus, the transmitter section 210 may include multiple antenna elements 214 that emit multiple transmissions 215, and the receiver section 220 may include multiple antenna elements 224 to receive the reflections 225. As such reflections over an azimuth range and an elevation range are obtained with the arrays of elements 214, 224. The detection system 110 may use known techniques such as beamforming at the antenna elements 224 of the receiver section 220 and specifically employ the Doppler effect to determine velocity of detected objects. Range and power (intensity) is also obtained from the reflections 225. Thus, the array of antenna elements 214, 224 facilitates obtaining an image in which each pixel may be thought to be associated with an azimuth, elevation, range and velocity value, as well as intensity. In addition, the detection system 110 may employ a model of the topology (indicating the targets in the line of sight) to simplify the identification of non-line of sight moving objects.

The transmitter section 210 and receiver section 220 are known and are not detailed herein. As shown in the expanded view in FIG. 2, the transmitter section 210 generally includes an oscillator 211, buffer 212, and power amplifier 213, and the receiver section 220 generally includes a pre-amplifier 221, mixer 222, and analog-to-digital (A/D) converter 223. The processing system 230 includes one or more memory devices 240 and one or more processors 250 to perform the non-line of sight obstacle detection. While the processing system 230 is shown as part of the detection system 110 and separate from other car control systems 270, for example, the processing system 230 that processes reflections 225 to perform non-line of sight obstacle detection may be shared among one or more systems in the host vehicle 100. Communication among the various systems (110, 270, 280, 105) may be based on hardwiring or wireless communication or on a combination of known communication schemes including, for example, over a shared bus. The processing of the reflections 225 that is performed by the processing system 230 to identify and localize non-line of sight objects approaching the host vehicle 100 is described with reference to FIG. 3.

Figure 3:
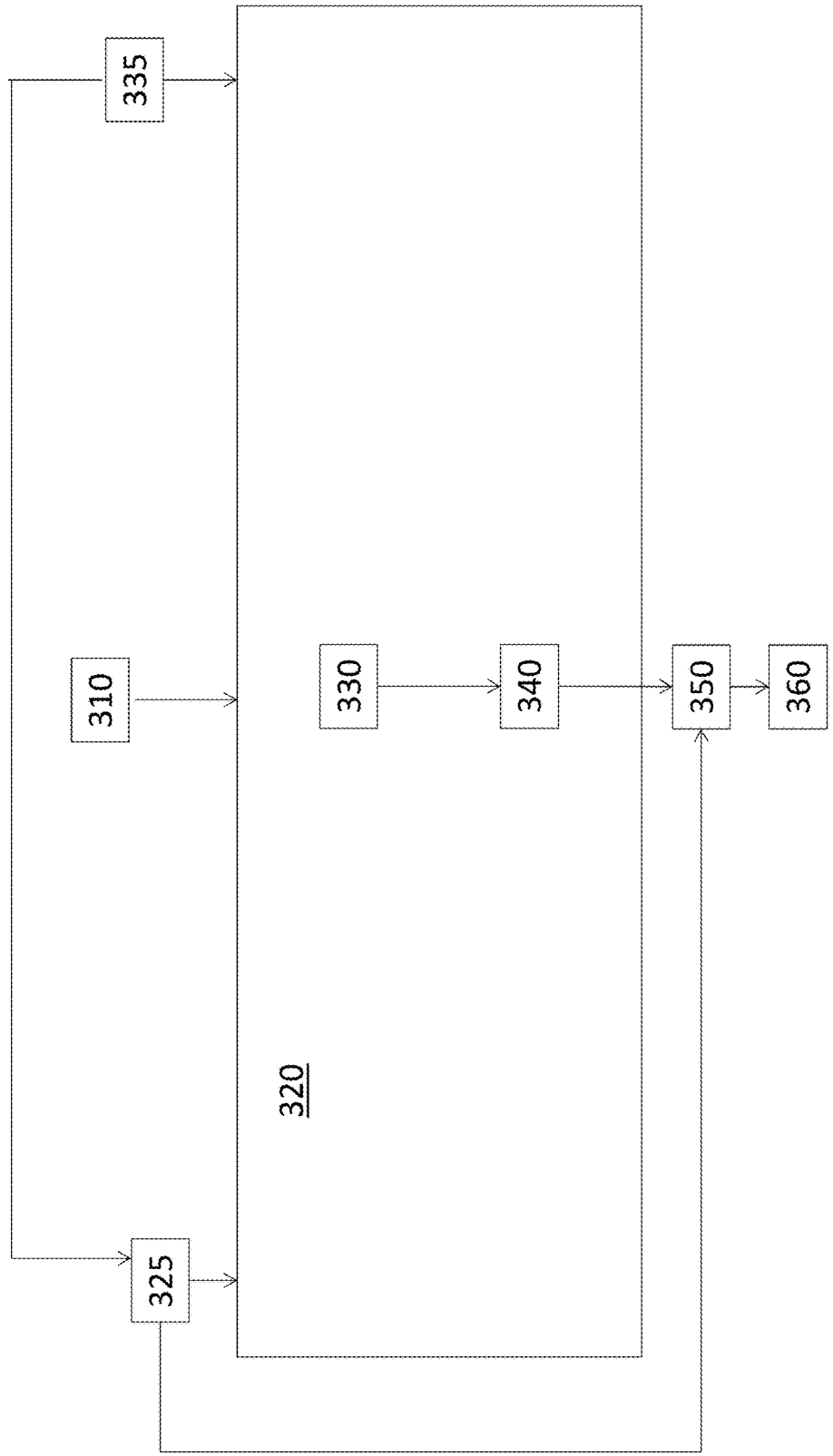
FIG. 3 is a process flow of a method of performing non-line of sight obstacle detection according to embodiments.

FIG. 3 is a process flow of a method of performing non-line of sight obstacle detection and localization according to embodiments. The exemplary embodiments detailed below refer to the reflections 225 received by the detection system 110 for explanatory purposes. As noted above, (range, velocity, azimuth, elevation) information used to perform non-line of sight detection may instead be obtained from other known sensor systems or other configurations of radar systems. At block 310, obtaining reflections 225 includes obtaining both direct and multipath reflections 225 based on the objects present. Obtaining reflections 225 also includes performing multiple transmissions 215 from each transmit antenna element 214 and obtaining multiple reflections 225 at each receive antenna element 224. Processing the reflections 225, at block 320, includes multiple processes 330, 340, 350, as shown. In addition to reflections 225 obtained at block 310, other information (obtained at blocks 325 and 335) is used to detect and localize non-line of sight objects (e.g., other vehicle 120b, FIG. 1). Obtaining other information, at block 325, refers to obtaining information from other sensors 105 or other processing systems of the platform 10 (e.g., host vehicle 100). The other information may include landscape information about the topology of the current location of the platform 10 (host vehicle 100). The landscape information may include the location of objects 130 like buildings, for example. This information may be provided as input to the host vehicle 100 or may be learned during previous visits to the same location by the host vehicle 100 according to a known dynamic learning algorithm. Monitoring host vehicle 100 motion parameters, at block 335, may include monitoring other sensors 105 such as a GPS receiver of the host vehicle 100, for example, to determine location and movement. As indicated in FIG. 3, the location information obtained by monitoring the host vehicle 100 (at block 335) is needed to obtain other information like the landscape information (at block 325).

Identifying reflections 225 from static surroundings, at block 330, refers to identifying pixels with zero velocity (zero Doppler). These pixels may then be associated with non-moving objects (e.g., objects 130a, 130b, FIG. 1). The identification at block 330 may be aided when the landscape information is available (from block 325). The landscape information helps to distinguish among the stationary objects 130 in the scene. That is, if the vehicle 120a in FIG. 1 is stopped, it may appear as a non-moving object. However, the landscape information (from block 325) may be used to distinguish vehicle 120a (which may be non-moving at the time of processing but is not stationary) with objects 130 (which are both non-moving at the time of processing and stationary). Identification of reflections 225 from static surroundings, at block 330, may be done first as a type of filtering of the reflections 225 to isolate the reflections 225 associated with moving (or movable) objects (both within and outside the line of sight of the host vehicle 100 monitoring system 110). This filtering out of static objects (at block 330) is followed by distinguishing between line of sight (e.g., 120a) and non-line of sight (e.g., other vehicle 120b, FIG. 1) moving objects at block 340. As part of the processing at block 340, pixels associated with movement may first be used to identify objects based on a known clustering algorithm. The remainder of the processing at block 340 then involves categorizing the objects as being within or outside the line of sight of the platform 10.

Distinguishing the line of sight moving objects from non-line of sight moving objects, at block 340, may be done according to different embodiments. According to one embodiment, other sensors 105 may be used based on information obtained at block 325. For example, a camera (105) mounted on the host vehicle 100 may be used and a known moving object detection within the field of view of the camera may be performed. The azimuth and elevation of pixels associated with any moving objects in the camera field of view may be translated to an azimuth and elevation associated with the field of view of the detection system 110. When the translated azimuth and elevation values correspond with azimuth and elevation values of moving objects or reflections 225 that are not filtered out as static (at block 330), then these objects or reflections 225 are associated with line of sight objects. According to another embodiment, a known statistical modeling approach is used on reflections 225 associated with moving objects. Once the non-line of sight moving objects are identified (at block 340), localizing the non-line of sight objects (e.g., 120b), at block 350, includes obtaining other information (at block 325), as indicated by FIG. 3. The other information may include a mapping of the current position of the host vehicle 100, for example. Indicating an approaching non-line of sight object, at block 360, includes determining, based on the localizing (at block 350), whether the non-line of sight moving object will intersect with the host vehicle 100. For example, in the scenario shown in FIG. 1, the non-line of sight object will intersect with the host vehicle 100 if both vehicles 100 proceed on the current path. However, in another exemplary scenario, the path on which the other vehicle 120b is shown may go below the path on which the host vehicle 100 is shown. In such a scenario, the other vehicle 120b and host vehicle 100 would not intersect. As such, localizing (at block 350) using a map may prevent the other vehicle 120b from being indicated as an approaching non-line of sight object at block 360. The indication provided at block 360 may be on a map (via a display system 280) visible to the driver of the host vehicle 100 as a warning of the approaching object (e.g., other vehicle 120b, FIG. 1). In additional or alternate embodiments, the indication may be provided to a car control system 270 (e.g., collision avoidance or automated steering system) to facilitate decisions regarding control of the host vehicle 100 based on the position and movement of the non-line of sight object(s).

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. A method of detecting and localizing a non-line of sight object, the method comprising:
    receiving reflections using a detection system of a vehicle, the reflections including direct and multipath reflections;
    identifying, using a processor, the reflections associated with static targets to retain the reflections associated with moving targets;
    distinguishing, using the processor, between line of sight objects and non-line of sight objects among the moving targets;
    localizing, using the processor, the non-line of sight objects relative to the vehicle; and
    indicating approaching non-line of sight objects among the non-line of sight objects, the approaching non-line of sight objects moving toward the vehicle on a path that intersects the vehicle.

2. The method according to claim 1, wherein the receiving the reflections includes transmitting radio frequency signals over a number of cycles from an array of transmit elements.

3. The method according to claim 1, further comprising obtaining information from sensors other than the detection system.

4. The method according to claim 3, wherein the obtaining the information includes obtaining a location of the vehicle and a map of the location and the identifying the reflections associated with the static targets includes identifying the static targets on the map.

5. The method according to claim 4, wherein the localizing the non-line of sight objects includes determining a location of the non-line of sight objects on the map.

6. The method according to claim 5, further comprising determining whether the non-line of sight objects are the approaching non-line of sight objects based on the map.

7. The method according to claim 3, wherein the obtaining the information includes obtaining moving object information from a camera and the distinguishing between the line of sight objects and the non-line of sight objects includes translating the moving object information to a location of the reflections.

8. The method according to claim 1, wherein the distinguishing between the line of sight objects and the non-line of sight objects is based on statistical modeling of the reflections associated with the line of sight objects and the non-line of sight objects.

9. A non-line of sight obstacle detection and localization system disposed in a vehicle, comprising:
a transmitter section configured to transmit radio frequency signals from a plurality of transmit elements;
a receiver section configured to receive reflections at a plurality of receive antenna elements, the reflections including direct and multipath reflections; and
a processing system configured to identify the reflections associated with static targets to retain the reflections associated with moving targets, distinguish between line of sight objects and non-line of sight objects among the moving targets, localize the non-line of sight objects relative to the vehicle, and indicate approaching non-line of sight objects among the non-line of sight objects, the approaching non-line of sight objects moving toward the vehicle on a path that intersects the vehicle.

10. The system according to claim 9, wherein the processing system obtains information from other sensors on the vehicle.

11. The system according to claim 10, wherein the information includes a location of the vehicle and a map of the location and the processing system identifies the reflections associated with the static targets by identifying the static targets on the map.

12. The system according to claim 11, wherein the processing system localizes the non-line of sight objects by determining a location of the non-line of sight objects on the map.

13. The system according to claim 12, wherein the processing system determines whether the non-line of sight objects are the approaching non-line of sight objects based on the map.

14. The system according to claim 10, wherein the information the information includes moving object information from a camera and the processing system distinguishes between the line of sight objects and the non-line of sight objects by translating the moving object information to a location of the reflections.

15. The system according to claim 9, wherein the processing system distinguishes between the line of sight objects and the non-line of sight objects based on statistical modeling of the reflections associated with the line of sight objects and the non-line of sight objects.

* * * * *